United States Patent [19]

Quirk

[11] Patent Number: 4,975,491

[45] Date of Patent: Dec. 4, 1990

[54] FUNCTIONALIZED POLYMERS PREPARED BY ANIONIC POLYMERIZATION

[75] Inventor: Roderic P. Quirk, Akron, Ohio

[73] Assignee: The Dow Chemical Company, Midland, Mich.

[21] Appl. No.: 298,438

[22] Filed: Jan. 18, 1989

[51] Int. Cl.[5] .......................................... C08F 275/00
[52] U.S. Cl. .................................. 525/288; 525/294; 525/299; 526/279; 526/310; 526/313; 526/318.1
[58] Field of Search ............ 526/279, 310, 313, 318.1; 525/288, 294, 299

[56] References Cited

U.S. PATENT DOCUMENTS

| | | | |
|---|---|---|---|
| 4,263,401 | 4/1981 | Chaumont et al. | 525/288 |
| 4,701,498 | 10/1987 | Roggero et al. | 525/294 |
| 4,731,424 | 3/1988 | Fujimoto et al. | 526/279 |
| 4,864,003 | 9/1989 | Fujimoto et al. | 525/288 |

FOREIGN PATENT DOCUMENTS

| | | | |
|---|---|---|---|
| 653696 | 12/1962 | Canada | 525/299 |
| 0053509 | 3/1984 | Japan | 526/279 |
| 0053516 | 3/1984 | Japan | 526/279 |
| 0084310 | 5/1985 | Japan | 526/279 |
| 61-127711 | 6/1986 | Japan | 526/279 |
| 61-250011 | 11/1986 | Japan | 526/279 |
| 61-250015 | 11/1986 | Japan | 525/288 |
| 63-210111 | 8/1988 | Japan | 526/313 |
| 2192189 | 1/1988 | United Kingdom | 526/313 |

OTHER PUBLICATIONS

Makromol Chem. Rapid Commun. 3, 941–946 (1982).
Makromol Chem. 186, 1157–1166 (1985).

Primary Examiner—Joseph L. Schofer
Assistant Examiner—N. Sarofim
Attorney, Agent, or Firm—Douglas N. Deline

[57] ABSTRACT

Novel polymers prepared by anionic polymerization techniques containing phenol, silyl ether, aminophenyl functionality or carboxylic acid or ester.

3 Claims, No Drawings

FUNCTIONALIZED POLYMERS PREPARED BY ANIONIC POLYMERIZATION

BACKGROUND OF THE INVENTION

The present invention relates to novel polymers containing functional groups. More particularly the present invention relates to homopolymers and block copolymers containing reactive functionality or precursors convertible to such reactive functionalities. The present compositions are elastomeric or rigid thermoplastics depending on the components thereof and may be used as molding polymers and modifiers for rigid thermoplastics or reacted by means of the included functionality. Beneficially the polymers may be prepared to contain only a minimum quantity of functionalizing groups distributed at specific sites within the polymer.

SUMMARY OF THE INVENTION

According to the present invention there is now provided a functionalized homopolymer or block copolymer comprising in polymerized form one or more monomers selected from the group consisting of monovinylidene aromatic monomers, conjugated dienes and methacrylate esters having up to 20 carbons in the ester group, and at least one functional unit corresponding to the formula $-CH_2-CXY-$ or $-CH_2-CXYH$, wherein X is phenyl, $C_{1-4}$ alkyl substituted phenyl or Y: and Y is

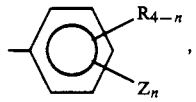

wherein R independently each occurrence is hydrogen or $C_{1-4}$ alkyl, n is 1,2 or 3, and Z is $-OSiR'_3$, $-OH$, $-NR_2$, $-N(SiR'_3)_2$, or $-COOR$, wherein R' is $C_{1-4}$ alkyl.

In a further embodiment of the present invention there is also provided a method for preparing certain of the above polymers comprising:

(i) contacting in any order, under anionic polymerization conditions so as to prepare a living polymer anion (a) one or more polymerizable monomers selected from the group consisting of monovinylidene aromatic monomers, conjugated dienes and methacrylate esters having up to 20 carbons in the ester group, and (b) one or more reactive agents corresponding to the formula $CH_2=CXY$ (I) wherein X is phenyl, $C_{1-4}$ alkyl substituted phenyl or Y: and Y is

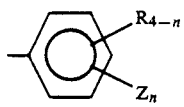

wherein R independently each occurrence is hydrogen or $C_{1-4}$ alkyl, n is 1,2 or 3, and Z is $-OSiR'_3$, $-NR'_2$, $-N(SiR'_3)_2$, or $-COOR'$, wherein R' is $C_{1-4}$ alkyl, (ii) terminating the living polymer anion, and
(iii) recovering the resulting polymer, provided that if a methacrylate ester having up to 20 carbons in the ester group is included in the polymerization, then the reactive agent is reacted prior to the polymerization of the methacrylate ester.

In a further embodiment of the invention polymers wherein Z is $-OH$, COOH or $-NR_2$ may be prepared by hydrolysis or aminolysis of the corresponding polymers wherein Z is $-OSiR'_3$, $-COOR'$ or $-N(SiR'_3)_2$.

DETAILED DESCRIPTION OF THE INVENTION

It is previously known in the art to prepare polymers and in particular block copolymers of monovinylidene aromatic monomers, conjugated diene monomers, alkyl methacrylates and combinations thereof via anionic polymerization techniques. Highly useful polymers are prepared in the form of such polymers containing one or more blocks of a monovinylidene aromatic polymer and optionally one or more blocks of an alkadiene polymer. Suitably such polymers are prepared in an organic solvent by the use of a suitable initiator, typically an alkali metal organyl compound, particularly sodium or lithium alkyls.

Highly desirable block copolymers are prepared using multifunctional anionic initiators particularly difunctional anionic initiators such as 1,3-phenylenebis(3-methyl-1-phenylpentylidene)-bis(lithium) as disclosed in U.S. Pat. No. 4,196,154. Utilizing such difunctional initiators the resulting product is a multiblock copolymer having a symmetrical geometry emanating from the central initial block containing the remnant of the difunctional initiator. Typically the living polymer anion that remains after addition of all monomers is terminated by contacting with a proton donating composition suitably an organic alcohol or acid. Additional teachings regarding the use of such difunctional lithium containing initiators is contained in U.S. Pat. Nos. 3,660,536: 3,776,893: 3,954,894: 4,172,190: 4,200,718: 4,205,016: 4,431,777: 4,427,837: and 4,614,768. The teachings of these references are incorporated herein in their entirety by reference thereto.

An alternative technique for preparing such multiblock copolymers involves the coupling of living polymer anions by the use of multifunctional vinyl compounds, such as divinyl benzene, multifunctional alkyl halides or other suitable coupling agent. In certain cases, ie. when multifunctional vinyl compounds are employed in such coupling reactions, the resulting coupled product retains living anion functionality and may be further reacted with either the previously named monomers or the previously described reactive agent (I) according to the present invention.

Techniques for the preparation of block copolymers of alkyl methacrylates have recently been disclosed in the teachings of James E. McGrath et al., Polymer Preprints, Vol. 28, No. 2, August (1987) p. 214–216 and in copending U.S. Ser. No. 172,040 filed Mar. 23, 1988 and U.S. Ser. No. 70,629 filed July 6, 1987, now U.S. Pat. No. 4,775,007, the teachings of which are incorporated herein in their entirety by reference thereto. It is additionally known in the art that alkyl methacrylate monomers may be polymerized under anionic polymerization conditions by inserting into the polymer anion a moderating structural unit such as 1,1-diphenylethylene prior to contacting the living polymer anion with the alkyl methacrylate.

Utilizing the foregoing techniques the polymers resulting from the present invention are in conventional block polymer form excepting that remnant functionality from the reactive agent (I) corresponding to the formula: $-CH_2-CXY-$, or $-CH_2-CHXY$ wherein X and Y are as previously defined is present interspersed within a polymer block, between succeeding polymer blocks, on the termini of the polymer, or attached to the remnant of a polyvinyl coupling agent. Such polymers may be prepared by polymerizing a mixture of one or more of the aforementioned monomers and one or more of the foregoing reactive agents, by polymerizing one or more blocks of the foregoing monomers in the absence of the reactive agent followed by reacting the resulting living polymer with the reactive agent, or by polymerizing one or more blocks of the aforementioned monomers followed by coupling of the resulting living polymer with a divinyl coupling agent, followed by reacting the resulting living polymer with the reactive agent. Regardless of the technique, additional quantities of monomer may be polymerized after addition of the foregoing functional groups as long as the living polymer is not terminated and methacrylate esters are polymerized only after the functionalizing reaction has taken place. The presence of methacrylate ester functionality in the living polymer has been found to interfer with later addition of the previously described functional groups.

A preferred monovinylidene aromatic monomer for use according to the present invention is styrene. Preferred conjugated diene monomers are butadiene and isoprene. Preferred methacrylate esters are $C_{1-18}$ alkyl methacrylates and most preferably $C_{1-10}$ alkyl methacrylates.

Preferred reactive agent (I) compounds for use according to the present invention include compositions according to the foregoing formula wherein X is phenyl, and Y is

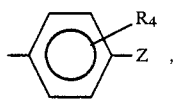

wherein R is hydrogen and Z is as previously defined.

Most highly preferred polymers according to the present invention are elastomeric block copolymers prepared by anionic polymerization techniques with difunctional initiators and corresponding to the formula HXYC—CH$_2$—AB(BA)$_m$—CH$_2$—CHXY wherein A is a block of styrene, B is a block of a conjugated diene monomer, m is a number from 1 to 10 indicating the number of repeating blocks, and X and Y are as previously defined.

For use in elastomeric and adhesive applications it is highly desirable that the polymer be in the form of a block copolymer of the above formula, wherein m is 1, and contain prior to incorporation of the reactive agent, from about 5 percent to about 30 percent monovinylidene aromatic monomer and the remainder conjugated diene monomer.

The polymers of the present invention wherein Z is —N(SiR'$_3$)$_2$, —NR'$_2$, —COOR' and —OSiR'$_3$ are prepared utilizing previously known anionic polymerization techniques excepting that the reactive agent (I) wherein Z is as above described is included in the reaction mixture at some time prior to the termination of the polymerization process. Preferably the reactive agent (I) is contacted with a living polymer anion after substantially complete polymerization of all monomers and prior to the termination of the polymer anion. It is understood that the reactive agent (I) adds to the living polymer by means of the reactive vinyl functionality but since the compound cannot form homopolymers this process is not referred to as a polymerization. It is further understood that after incorporation of the reactive functionality, the living polymer anion may be coupled using the previously described coupling agents.

Suitable solvents for the present process include inert liquid hydrocarbons, e.g. hexane, toluene etc., inert aliphatic compounds such as tetrahydrofuran, and mixtures thereof. By the term "inert" is meant that the solvent does not interfer with the polymerization process or with the reaction of the reactive agent.

In a subsequent step, the above compounds containing trialkylsilyl protecting group in the functionality, Z, or ester functionality may be hydrolyzed thereby forming the corresponding phenol or amine functionality. In addition such compounds containing ester functionality may be converted to carboxylic acid functionality by a similar hydrolysis. In one suitable process the polymer may be contacted with a dilute solution of an acid in an inert organic solvent or other suitable medium. Temperatures from 25° C. to 150° C. may be employed to effect the hydrolysis according to well known techniques in the art.

Aminolysis of an amine containing polymer may be conducted by contacting the polymer with ammonia or a suitable amine at an elevated temperature on the order of 50°–200° C. The process may be conducted in an extruder while in a molten state or in an inert solvent.

Having described the invention the following examples are provided as further illustrative and are not to be construed as limiting. Parts and percentages, where provided, are measured on a weight basis.

EXAMPLE 1

4-(Dimethylamino)benzophenone was purified by sublimation, mp 88°–90° C. A solution of 25 g (0.11 mol) of 4-(dimethylamino)benzophenone in 100 mL of tetrahydrofuran was added dropwise to a solution of the ylid generated from 95 ml (0.13 mol) of 1.4M methyllithium in diethyl ether and 53.8 g (0.13 mol) of methyltriphenylphosphonium iodide at 0° C. After 12 h, the reaction was quenched by a few drops of methanol. Triphenylphosphine oxide was filtered from the product. The residual triphenylphosphine oxide was separated by silica gel chromatography using toluene as the eluent. The product was further purified by three recrystallizations from methanol. Pale yellowish crystals were obtained. The product was identified as 1-(4-dimethylaminophenyl)-1-phenylethylene.

Polymerizations were carried out at room temperature in all glass, sealed reactors using breakseals and standard high vacuum techniques. Styrene monomer was purified prior to use. Reactions of the living styryl lithium polymer resulting after complete polymerization of styrene monomer in benzene solution using sec-butyllithium initiator with 1-(4-dimethylaminophenyl)-1-phenylethylene were effected by fragmenting the breakseal of the ampoule containing the reactive agent in benzene. The extent of the coupling reaction was monitored by ultraviolet-visible spectroscopy at 406 nm. After three days the reaction was quenched with degassed methanol. The functionalized polystyrene was isolated by precipitation into excess methanol and dried in a vacuum oven.

The resulting polymer had a Mw of $4.4 \times 10^3$ as determined by size exclusion chromatography (polystyrene standard). Mw/Mn was 1.05. End group titration of amine by titration in a 1/1 volume ratio mixture of chloroform and glacial acetic acid, using perchloric acid in glacial acetic acid (0.1N, Fisher) as the titrant and methyl violet as the indicator indicated substantially complete polymer termination with amine functional groups. Analysis indicated the product was polystyrene capped with a 1-(4-dimethylaminophenyl)-1-phenylethyl group.

EXAMPLE 2

To a solution of 26.9 g (0.13 mol) of purified 4-hydroxybenzophenone in N,N-dimethylformamide was added 28.0 g (0.18 mol) of tert-butyldimethylsilyl chloride and 42.0 g (0.60 mol) of imidazole, followed by heating at 45° C. for 4 h. The mixture was extracted with 300 mL of 5% NaHCO$_3$ and with hexane, followed by solvent removal using a rotary evaporator. The residue was chromatographed on silica gel using toluene as eluent to produce a clear, viscous liquid.

A solution of 32.0 g (0.11 mol) of 4-(tert-butyldimethylsiloxy)benzophenone in 100 mL of tetrahydrofuran was added dropwise at 0° C. to a solution of the ylid generated from 114 mL of 1,4M methyllithium in diethyl ether and 52.5 g (0.13 mol) of methyltriphenylphosphonium iodide. After 12 h the product was purified by silica gel chromatography using toluene as eluent followed by vacuum distillation to yield a clear liquid: density, 1.00 g/ml. The product was identified as 1-(4-tert-butyldimethylsiloxyphenyl-1-phenylethylene.

Polymerization of purified styrene was carried out at room temperature in benzene with sec-butyllithium initiator in all glass, sealed reactors using breakseals and standard high vacuum techniques. The functionalization reaction with 1-(4-tert-butyldimethylsiloxyphenyl)-1-phenylethylene was effected by rupturing the breakseal for the ampoule containing the terminating agent in benzene. The extent of the coupling reaction was monitored by UV-VIS spectroscopy at 406 nm. After three days the reaction was quenched with degassed methanol. The functionalized polystyrene was isolated by precipitation into excess methanol and dried in a vacuum oven. The product was substantially quantitatively converted to siloxy functionalized polymer. The product was identified as polystyrene containing 1-(4-tert-butyldimethylsiloxyphenyl)-1-phenylethyl terminal functionality.

EXAMPLE 3

The siloxy functionalized polymer of Example 3 was refluxed in tetrahydrofuran containing 1 wt % HCl for 3 hours. 4-Hydroxyphenyl-terminated polystyrene was isolated by methanol precipitation of the resulting product. The resulting polymer had Mw of $1.36 \times 10^4$, Mw/Mn of 1.04, and was identified as polystyrene containing 1-(4-hydroxyphenyl)-1-phenylethyl terminal functionality.

What is claimed is:

1. A process for preparing a functionalized homopolymer or block copolymer comprising in polymerized form one or more monomers selected from the group consisting of monovinylidene aromatic monomers, conjugated dienes and methacrylate esters having up to 20 carbons in the ester group, and at least one functional unit corresponding to the formula —CH$_2$—CXY— or —CH$_2$—CXYH, wherein X is phenyl, C$_{1-4}$ alkyl substituted phenyl or Y; and Y is

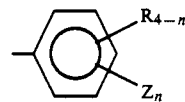

wherein R independently each occurrence is hydrogen or C$_{1-4}$ alkyl, n is 1,2 or 3, and Z is —OSiR'$_3$, —NR$_2$, —N(SiR'$_3$)$_2$, or —COOR, wherein R' is C$_{1-4}$ alkyl:

the steps of the process comprising:
(i) contacting in any order, under anionic polymerization conditions so as to prepare a living polymer anion, (a) one or more polymerizable monomers selected from the group consisting of monovinylidene aromatic monomers, conjugated dienes and methacrylate esters having up to 20 carbons in the ester group, and (b) one or more reactive agents corresponding to the formula CH$_2$=CXY (I) wherein X is phenyl, C$_{1-4}$ alkyl substituted phenyl or Y: and Y is

wherein R independently each occurrence is hydrogen or C$_{1-4}$ alkyl, n is 1,2 or 3, and Z is —OSiR'$_3$, —NR'$_2$, —N(SiR'$_3$)$_2$, or —COOR', wherein R' is C$_{1-4}$ alkyl,
(ii) terminating the living polymer anion, and
(iii) recovering the resulting polymer,
provided that, if a methacrylate ester having up to 20 carbons in the ester group is included in the polymerization, then any reactive agent is reacted prior to the polymerization of such methacrylate ester.

2. A process according to claim 1 wherein the reactive agent is 1-(4-dimethylaminophenyl)-1-phenylethylene, 1-(4-tertbutyldimethylsiloxy)phenyl-1-phenyl ethylene, or 1-(4-di(trimethylsilyl)aminophenyl)-1-ethylene.

3. A process for preparing a functionalized homopolymer or block copolymer comprising in polymerized form one or more monomers selected from the group consisting of monovinylidene aromatic monomers, conjugated dienes and methacrylate esters having up to 20 carbons in the ester group, and at least one functional unit corresponding to the formula —CH$_2$—CXY— or —CH$_2$—CXYH—, wherein X is phenyl, C$_{1-4}$ alkyl substituted phenyl or Y: and Y is

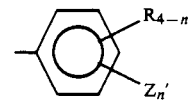

wherein R independently each occurrence is hydrogen or C$_{1-4}$ alkyl, n is 1,2 or 3, and Z is —OH:
the steps of the process comprising
(i) contacting in any order, under anionic polymerization conditions so as to prepare a living polymer anion, (a) one or more polymerizable monomers selected from the group consisting of monovinylidene aromatic monomers, conjugated dienes and methacrylate esters having up to 20 carbons in the ester group, and (b) one or more reactive agents corresponding to the formula CH$_2$=CXY (I)

wherein X is phenyl, C$_{1-4}$ alkyl substituted phenyl or Y: and Y is

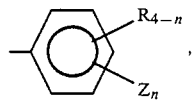

wherein R independently each occurrence is hydrogen or C$_{1-4}$ alkyl, n is 1,2 or 3, and Z' is —OSiR'$_3$, wherein R' is C$_{1-4}$ alkyl,
   (ii) terminating the living polymer anion,
   (iii) recovering the resulting polymer, and
   (iv) hydrolyzing the polymer to convert the trialkylsilyl group to a hydroxyl group,
provided that, if a methacrylate ester having up to 20 carbons in the ester group is included in the polymerization, then any reactive agent is reacted prior to the polymerization of such methacrylate ester.

* * * * *